(12) United States Patent
Jindal (10) Patent No.: US 10,527,025 B2
(45) Date of Patent: Jan. 7, 2020

(54) VARIABLE SPRING RATE ENGAGEMENT MECHANISM

(71) Applicant: UNITED TECHNOLOGIES CORPORATION, Farmington, CT (US)

(72) Inventor: Ravi Chand Jindal, West Palm Beach, FL (US)

(73) Assignee: UNTIED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/863,420

(22) Filed: Jan. 5, 2018

(65) Prior Publication Data

US 2019/0211807 A1 Jul. 11, 2019

(51) Int. Cl.
*F03G 1/10* (2006.01)
*F03G 1/02* (2006.01)
*F16F 3/04* (2006.01)
*F16F 1/12* (2006.01)

(52) U.S. Cl.
CPC ............. *F03G 1/10* (2013.01); *F03G 1/02* (2013.01); *F16F 1/128* (2013.01); *F16F 3/04* (2013.01); *F16F 2228/066* (2013.01)

(58) Field of Classification Search
CPC ...... F16F 1/14; F16F 1/16; F16F 1/128; F16F 3/04; F16F 2228/066; F16F 2228/14; F41A 3/82; F03G 7/065; F03G 1/02; F03G 2730/02; B64G 1/641; B64G 1/645; F16B 1/0014; B61F 5/12; B60G 2204/124; Y02E 10/46

USPC ............. 267/175, 225, 252, 289, 128, 291
See application file for complete search history.

(56) References Cited

U.S. PATENT DOCUMENTS

| 1,711,300 | A | | 4/1929 | Ziegler |
| 2,639,913 | A | * | 5/1953 | Reynolds ................ F16F 3/04 |
| | | | | 267/128 |
| 3,556,504 | A | | 1/1971 | Sinclair |
| 4,378,713 | A | * | 4/1983 | Haskell ................ F16C 1/226 |
| | | | | 188/196 B |
| 6,892,557 | B2 | * | 5/2005 | Bieniek ............... E05B 47/0642 |
| | | | | 70/278.2 |
| D571,059 | S | * | 6/2008 | Napolitano ............... D30/153 |
| 8,850,901 | B2 | | 10/2014 | Mankame et al. |
| 9,205,924 | B2 | | 12/2015 | Geng |
| 9,234,509 | B2 | | 1/2016 | Mankame et al. |

(Continued)

FOREIGN PATENT DOCUMENTS

| EP | 2514570 | 10/2012 |
| FR | 3017337 | 8/2015 |

OTHER PUBLICATIONS

European Patent Office, European Search Report dated Apr. 3, 2019 in Application No. 18202316.8.

*Primary Examiner* — Robert A. Siconolfi
*Assistant Examiner* — San M Aung
(74) *Attorney, Agent, or Firm* — Snell & Wilmer, L.L.P.

(57) ABSTRACT

A multi-spring mechanical actuator includes a first spring having a first spring constant and a second spring having a second spring constant different than the first spring constant, wherein a load actuator is configured against the first spring under one loading condition and against a spring differential between the first spring and the second spring under a different loading condition.

19 Claims, 7 Drawing Sheets

(56) References Cited

U.S. PATENT DOCUMENTS

| | | | |
|---|---|---|---|
| 2006/0049560 A1* | 3/2006 | Chun | F16F 1/041 |
| | | | 267/169 |
| 2016/0258502 A1* | 9/2016 | Cleveland | G09B 9/00 |
| 2017/0144775 A1 | 5/2017 | Jezewski et al. | |
| 2017/0211551 A1* | 7/2017 | Albright | F42B 10/14 |

* cited by examiner

VARIABLE SPRING RATE ENGAGEMENT MECHANISM

STATEMENT OF U.S. GOVERNMENT RIGHTS

This invention was made with government support under Contract No. FA8626-16-C-2139 awarded by the U.S. Air Force. The government has certain rights in the invention.

FIELD

In general, this disclosure relates to mechanical actuators.

BACKGROUND

Springs have been used as mechanical devices for storing energy. When a spring is stretched or compressed from a nominal, non-biased, and/or resting position, it exerts an opposing force approximately proportional to its change in length. If a first spring is more powerful than a second spring acting on a common element, the effect of the second spring can be either muted and/or non-existent as compared to the first spring. However, many applications that call for using two or more springs change from one spring constant to another spring constant in response to a load acting upon the springs. In other words, the benefit of multiple springs can be advantageous.

SUMMARY

In various embodiments, a multi-spring mechanical actuator includes a body having a cavity within the body; a first spring disposed within the cavity, the first spring having a first spring constant and attached between a fixed support at a first end of the body and a movable support, the movable support having a first clamp proximate a second end of the body opposite the first end of the body; a second spring disposed within the cavity, the second spring having a second spring constant different than the first spring constant and attached between a load actuator at the second end of the body and the movable support, the load actuator having a second clamp proximate the first end of the body and configured for releasable engagement with the first clamp; wherein the load actuator is configured against the first spring when the first clamp and the second clamp are engaged; and wherein the load actuator is configured against a spring differential between the first spring and the second spring when the first clamp and the second clamp are disengaged.

In various embodiments: the movable support is translatable and rotable within the body; and/or the movable support includes one or more outwardly protruding tabs configured for translation and rotation within a track system of the body; and/or the track system is disposed within an internal wall of the body; and/or the load actuator is translatable and rotable within the body; and/or the load actuator includes one or more outwardly protruding tabs configured for translation and rotation within a track system of the body; and/or the track system is disposed within an internal wall of the body; and/or the first spring constant is greater than the second spring constant; and/or the first clamp contains one or more support elements configured for engagement and disengagement with one or more support elements from the second clamp; and/or the support elements of the first clamp and the support elements of the second clamp are configured to rotably engage to translate the movable support and the load actuator together against the first spring; and/or the support elements of the first clamp and the support elements of the second clamp are configured to rotably disengage to translate the load actuator against the spring differential; and/or the body includes a track system for translating and rotating the movable support and the load actuator within the body.

In various embodiments, a system for configuring a load placed on a load actuator includes a first spring having a first spring constant; and a second spring having a second spring constant; wherein a load placed on the load actuator is configured against the first spring under a loading condition and against a spring differential between the first spring and the second spring when the first spring constant is exceeded under the loading condition; and wherein an engagement/disengagement mechanism within the load actuator is configured to transition the load on the load actuator between the first spring and the spring differential.

In various embodiments: the engagement/disengagement mechanism is configured to transition the load on the load actuator from the first spring to the spring differential; and/or the engagement/disengagement mechanism is configured to transition the load on the load actuator from the spring differential to the first spring; and/or the first spring constant is greater than the second spring constant.

In various embodiments, a method for configuring a load placed on a load actuator includes placing a load on a load actuator configured against a first spring constant of a first spring; exceeding the first spring constant; and transitioning the load on the load actuator against a spring differential between the first spring constant and a second spring constant of a second spring when the first spring constant is exceeded.

In various embodiments: the first spring constant is greater than the second spring constant; and/or the method further includes transitioning the load on the load actuator against the first spring constant when the first spring constant is no longer exceeded; and/or the first spring constant is greater than the second spring constant.

BRIEF DESCRIPTION OF THE DRAWINGS

The accompanying drawings illustrate various embodiments employing the principles described herein and are a part of the specification. The illustrated embodiments are meant for description only, and they do not limit the scope of the claims, and in which:

FIG. 1-A is an external perspective view of a multi-spring mechanical actuator, according to various embodiments;

FIG. 1-B is a first partial cut-away perspective view of the multi-spring mechanical actuator of FIG. 1-A, according to various embodiments;

FIG. 1-C is a second partial cut-away perspective view of the multi-spring mechanical actuator of FIGS. 1-A and 1-B, according to various embodiments;

FIG. 2-A is a first front view of an inner configuration of a multi-spring mechanical actuator, according to various embodiments;

FIG. 2-B is a second front view of the inner configuration of the multi-spring mechanical actuator of FIG. 2-A, according to various embodiments;

FIG. 2-C is a third front view of the inner configuration of the multi-spring mechanical actuator of FIG. 2-B, according to various embodiments;

FIGS. 5-A and 5-B are top views of a first clamp and a second clamp of the multi-spring mechanical actuator of FIG. 3, according to various embodiments;

FIGS. 6A through 6-H are further front views of the inner configuration of the multi-spring mechanical actuator of FIG. 2-A through FIG. 2-C, according to various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit of the disclosure. Thus, the detailed description herein is presented for purposes of illustration only and not of limitation.

Provided herein, according to various embodiments, is a resettable mechanical fuse and/or mechanical actuator, such as can be used with brake components, gas turbine engines, etc. While details included herein pertain to such systems, the systems disclosed herein can be applied to other systems with other resettable mechanical fuses and/or mechanical actuators and/or the like.

Figure 1:
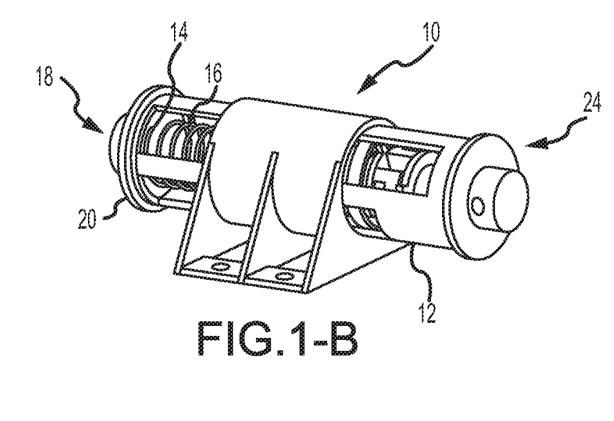

Referring now to FIGS. 1-A, 1-B, and 1-C, a multi-spring mechanical actuator 10 is illustrated. The multi-spring mechanical actuator 10 includes a body 12 defining a cavity 14 internal to the body 12. Within the cavity 14 of the body 12, a first spring 16 is proximate a first end 18 of the body 12. On one side, the first spring 16 is attached to a fixed support 20 at the first end 18 of the body 12. On the other side, the first spring 16 is attached to a movable support 22 proximate a second end 24 of the body 12. The movable support 22 has a first clamp 26 proximate the second end 24 of the body 12. The first end 18 of the body 12 and the second end 24 of the body 12 are on generally opposing sides of the multi-spring mechanical actuator 10, including as defined about a longitudinal axis $L_1$-$L_2$ extending generally lengthwise of the multi-spring mechanical actuator 10.

Also within the cavity 14 of the body 12, a second spring 28 is proximate the second end 24 of the body 12. On one side, the second spring 28 is attached to a load actuator 30 proximate the second end 24 of the body 12. On the other side, the second spring 28 is attached to the movable support 22. The load actuator 30 has a second clamp 32 proximate the first end 18 of the body 12.

In various embodiments, the movable support 22 and the load actuator 30 translate within the body 12 of the multi-spring mechanical actuator 10 along the longitudinal axis $L_1$-$L_2$.

In various embodiments, the first spring 16 is characterized by a first spring constant $K_1$. In various embodiments, the second spring 28 is characterized by a second spring constant $K_2$, which is different than the first spring constant $K_1$ of the first spring 16.

In various embodiments, the first spring constant $K_1$ of the first spring 16 is greater than the second spring constant $K_2$ of the second spring 28. In various embodiments, the second spring constant $K_2$ of the second spring 28 is greater than the first spring constant $K_1$ of the first spring 16.

In various embodiments, when the first spring 16 and the second spring 28 operate together, a spring differential is created between the first spring 16 and the second spring 28, characterized by additive and/or subtractive differences between the first spring constant $K_1$ of the first spring 16 and the second spring constant $K_2$ of the second spring 28—e.g., ($K_1$+$K_2$) or ($K_1$-$K_2$) or ($K_2$-$K_1$).

In various embodiments, the first clamp 26 of the movable support 22 and the second clamp 32 of the load actuator 30 are configured for releasable engagement. In other words, the first clamp 26 and the second clamp 32 can be engaged of disengaged. Taken together, the first clamp 26 and the second clamp 32 comprise an engagement/disengagement mechanism 50 disposed within the body 12 of the multi-spring mechanical actuator 10.

In various embodiments, when the first clamp 26 and the second clamp 32 are engaged, they translate together as one unit within the body 12 of the multi-spring mechanical actuator 10, particularly according to the first spring 16, as do the movable support 22 and the load actuator 30 relatedly translate together.

In various embodiments, when the first clamp 26 and the second clamp 32 are disengaged, they do not translate together as one unit within the body 12 of the multi-spring mechanical actuator 10. Instead, the movable support 22 translates according to the first spring 16 and the load actuator 30 translates according to a spring differential between the first spring 16 and the second spring 28, in various embodiments.

Figure 2:
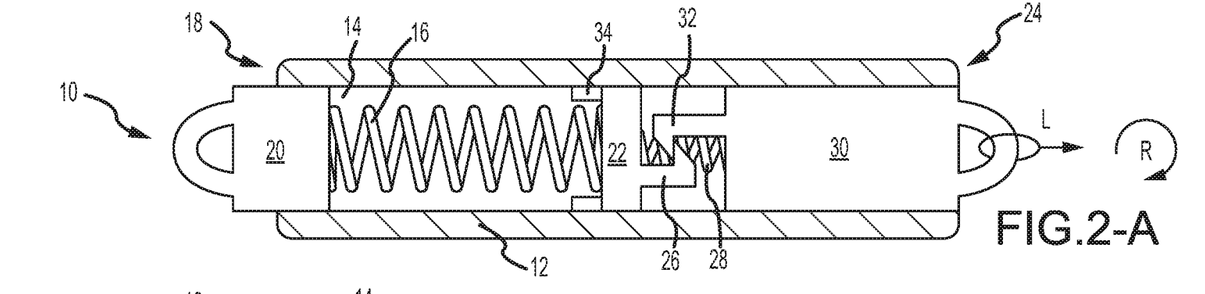

In various embodiments, one illustration of this arrangement is provided in FIGS. 2-A, 2-B, and 2-C. For example, in FIGS. 2-A and 2-B, the first clamp 26 and the second clamp 32 are engaged. Accordingly, when the load actuator 30 translates in the direction of $L_2$ (as a result of placing a load L, for example, on the load actuator 30 that is greater than the first spring constant $K_1$ of the first spring 16), as when going from FIG. 2-A to FIG. 2-B, the first spring 16 expands or stretches in the direction of $L_2$ too (and the second spring 28 remains in an unchanged state). Likewise, when the load actuator 30 translates in the direction of $L_1$, (as a result of the load, for example, on the load actuator 30 being less than the first spring constant $K_1$ of the first spring 16), as when going from FIG. 2-B to FIG. 2-A, the first spring 16 compresses or recoils in the direction of $L_1$ too (and the second spring 28 remains in an unchanged state). In various embodiments, when the first clamp 26 and the second clamp 32 are disengaged, as shown in FIG. 2-C, the movable support 22 is under the characteristic of spring constant $K_1$ of the first spring 16, and the load actuator 30 is under the characteristic of a spring differential between the first spring 16 and the second spring 28. Upon disengagement between the first clamp 26 and the second clamp 32, the movable support 22, in various embodiments, recoils towards the first end 18 of the body 12 under the control of the first spring 16 and in the direction of $L_1$, for example, up to a limiter 34 disposed within the cavity 14 of the body 12 and configured as a stopping buffer for the movable support 22 in the direction of $L_1$.

In various embodiments, the first clamp 26 of the movable support 22 and the second clamp 32 of the load actuator 30 are also configured for mating, twisting alignment, as well as for the above-described lateral movement about the longitudinal axis $L_1$-$L_2$. For example, and referring now to FIG. 3, the first clamp 26 of the movable support 22 includes one or more support elements 26A, 26B, 26C, 26D spaced apart from one another and disposed on a same side of a support surface 36 of the movable support 22. In various embodiments, the four support elements 26A, 26B, 26C, 26D are disposed on the support surface 36 of the first clamp 26. In various embodiments, different quantities are disposed on the support surface 36. Referring generally, respective exterior top surfaces 26A-t, 26B-t, 26C-t, 26D-t of the four support elements 26A, 26B, 26C, 26D are partially-pie shaped and distal the support surface 36, in various embodiments. Referring generally, respective bottom surfaces 26A-b, 26B-b, 26C-b, 26D-b (representatively depicted for clarity) of the four support elements 26A, 26B, 26C, 26D are notched internally towards the four support elements 26A, 26B, 26C, 26D and proximate the support surface 36, in various embodiments.

Figure 3:
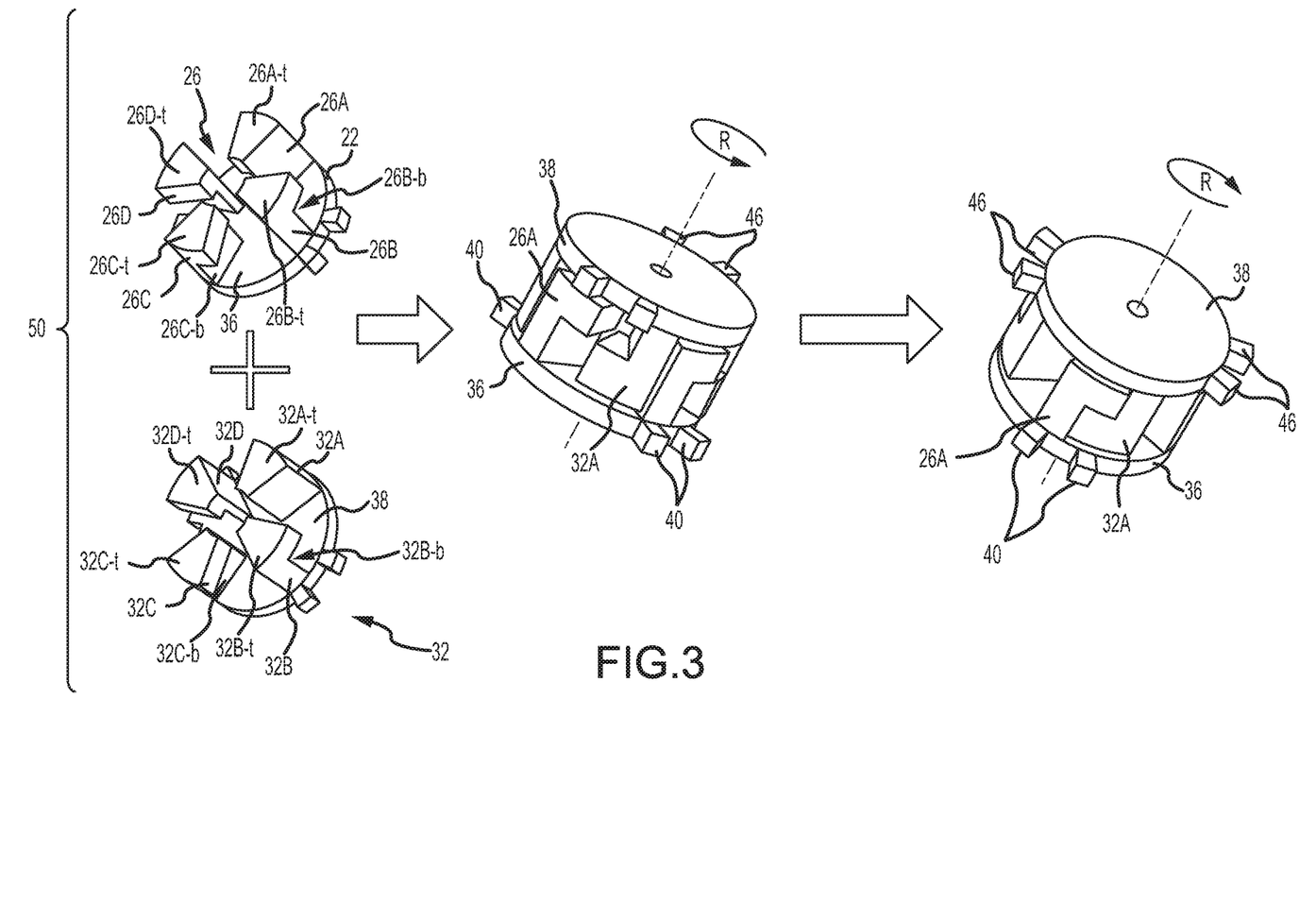
FIG. 3 is a compounded perspective view of a first clamp and a second clamp of a multi-spring mechanical actuator, according to various embodiments.

Likewise, a second clamp 32 of the load actuator 30 mirrors the configuration of the first clamp 26 of the movable support 22. More specifically, the second clamp 32 of the load actuator 30 includes one or more support elements 32A, 32B, 32C, 32D spaced apart from one another and disposed on a same side of a support surface 38 of the load actuator 30. In various embodiments, the four support elements 32A, 32B, 32C, 32D are disposed on the support surface 38 of the second clamp 32. In various embodiments, different quantities are disposed on the support surface 38. Referring generally, respective exterior top surfaces 32A-t, 32B-t, 32C-t, 32D-t of the four support elements 32A, 32B, 32C, 32D are partially-pie shaped and distal the support surface 38, in various embodiments. Referring generally, respective bottom surfaces 32A-b, 32B-b, 32C-b, 32D-b (representatively depicted for clarity) of the four support elements 32A, 32B, 32C, 32D are notched internally towards the four support elements 32A, 32B, 32C, 32D and proximate the support surface 38, in various embodiments.

In various embodiments, the notches of the respective bottom surfaces 26A-b, 26B-b, 26C-b, 26D-b of the four support elements 26A, 26B, 26C, 26D of the first clamp 26 are configured for rotatable alignment with the four support elements 32A, 32B, 32C, 32D of the second clamp 32, and the notches of the respective bottom surfaces 32A-b, 32B-b, 32C-b, 32D-b of the four support elements 32A, 32B, 32C, 32D of the second clamp 32 are configured for rotatable alignment with the four support elements 26A, 26B, 26C, 26D of the first clamp 26. When rotated into one position, the set of corresponding notches allow the first clamp 26 to engage with second clamp 32, in various embodiments. When rotated into an opposing position, the set of corresponding notches allow the first clamp 26 to disengage with second clamp 32. In various embodiments, rotation, as described, is generally defined about a rotational axis R extending circumferentially about the body 12 of the multi-spring mechanical actuator 10.

In various embodiments, the movable support 22 and the load actuator 30 rotate within the body 12 of the multi-spring mechanical actuator 10 along the rotational axis R.

Referring still to FIG. 3, the support surface 36 of the movable support 22 also contains one or more radially protruding tabs 40, in various embodiments. In various embodiments, the radially protruding tabs 40 of the support surface 36 of the movable support 22 are configured for engagement in a track system 42 (shown in FIG. 4) disposed within an internal surface 44 of the body 12 of the multi-spring mechanical actuator 10.

Likewise, the support surface 38 of the load actuator 30 also contains one or more radially protruding tabs 46, in various embodiments. In various embodiments, the radially protruding tabs 46 of the support surface 38 of the load actuator 30 are also configured for engagement in the track system 42 (shown in FIG. 4) disposed within the internal surface 44 of the body 12 of the multi-spring mechanical actuator 10.

Figure 4:
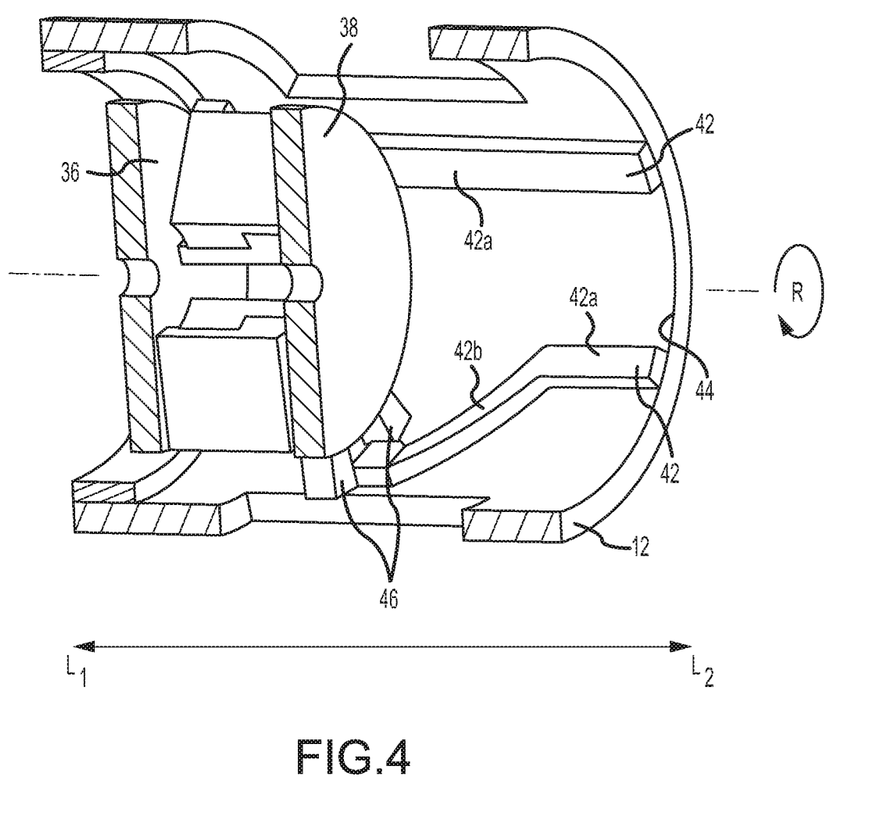
FIG. 4 is a cut-away view of a part of a body of a multi-spring mechanical actuator having a track system, according to various embodiments.

Referring now to FIG. 4, the track system 42 disposed within the internal surface 44 of the body 12 of the multi-spring mechanical actuator 10 is configured for engagement with the radially protruding tabs 40 of the support surface 36 of the movable support 22 and the radially protruding tabs 46 of the support surface 38 of the load actuator 30. More specifically, the protruding tabs 40, 46 are slidingly arranged to guide the movable support 22 and the load actuator 30 for motion within the multi-spring mechanical actuator 10. Linear segments 42a of the track system 42 guide the movable support 22 and the load actuator 30 along the longitudinal axis $L_1$-$L_2$ of the multi-spring mechanical actuator 10. As such, the linear segments 42a enable component translation within the body 12 of the multi-spring mechanical actuator 10. Likewise, radial segments 42b of the track system 42 guide the movable support 22 and the load actuator 30 along the rotational axis R of the multi-spring mechanical actuator 10. As such, the radial segments 42b enable component rotation within the body 12 of the multi-spring mechanical actuator 10. Accordingly, the track system 42 allows the first clamp 26 and the second clamp 32 to engage and/or disengage as desired within the multi-spring mechanical actuator 10, thereby including engaging the first spring 16 at the first spring constant $K_1$ in various embodiments, or the first spring 16 and the second spring 28 at the spring differential between the first spring constant $K_1$ and the second spring constant $K_2$, in various embodiments.

In various embodiments, the track system 42 is disposed through the body 12 of the multi-spring mechanical actuator 10, as opposed to being disposed within the internal surface 44 of the body 12 of the multi-spring mechanical actuator 10, in various embodiments.

Figure 5:
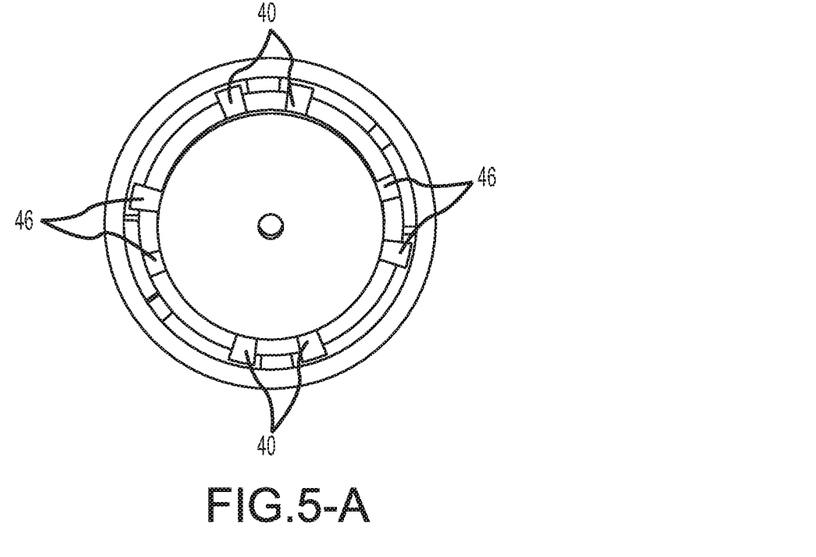

Referring now to FIG. 5, the radially protruding tabs 40 of the support surface 36 of the movable support 22 and the radially protruding tabs 46 of the support surface 38 of the load actuator 30 are viewed in a first location in FIG. 5-A and in a second location in FIG. 5-B, wherein the radially protruding tabs 46 of the support surface 38 of the load actuator 30 have rotated approximately 20 degrees about rotational axis R towards the radially protruding tabs 40 of the support surface 36 of the movable support 22 in FIG. 5-B, including as the first clamp 26 and the second clamp 32 engage and/or disengage.

Figure 6:
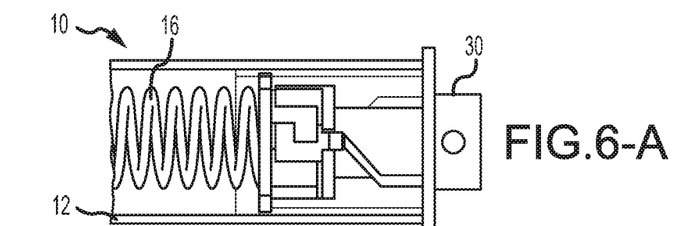

Referring now to FIG. 6, the multi-spring mechanical actuator 10 is shown with the first spring 16 and the second spring 28 disposed within the body 12 of the multi-spring mechanical actuator 10.

More specifically, in FIG. 6-A, the first clamp 26 and the second clamp 32 are fully engaged. Since the first clamp 26 and the second clamp 32 are fully engaged, the movable support 22 and the load actuator 30 translate together as one unit within the body 12 of the multi-spring mechanical actuator 10, particularly according to the first spring 16 and the first spring constant $K_1$.

In FIG. 6-B, the first clamp 26 and the second clamp 32 remain engaged as the load actuator 30 translates in a first direction about the longitudinal axis $L_1$-$L_2$ (e.g., towards $L_2$). At this point, the movable support 22 and the load actuator 30 have translated about the linear segments 42a of the track system 42, and the multi-spring mechanical actuator 10 is active according to the first spring 16 and the first spring constant $K_1$.

In FIG. 6-C, the first clamp 26 and the second clamp 32 have just disengaged as the load actuator 30 rotated about the rotational axis R. At this point, the load actuator 30 has rotated about the radial segments 42b of the track system 42, and the multi-spring mechanical actuator 10 transitions from the first spring constant $K_1$ to the spring differential between the first spring constant $K_1$ and the second spring constant $K_2$.

In FIG. 6-D, the first clamp 26 and the second clamp 32 have fully disengaged and separated. Accordingly, the first spring 16 recoils towards the first end 18 of the body 12 (up to the limiter 34 shown in FIG. 1), according to conditioning of the first spring 16, in various embodiments. At this point, the multi-spring mechanical actuator 10 is operative at the spring differential between the first spring constant $K_1$ and the second spring constant $K_2$, including as the load actuator 30 continues to translate about the linear segments 42a of the track system 42 in the first direction about the longitudinal axis $L_1$-$L_2$ (e.g., towards $L_2$).

Following the disengagement process of FIGS. 6-A through 6-D, the re-engagement process of FIGS. 6-E through 6-H is the reverse. More specifically, in FIG. 6-E, the second clamp 32 returns towards the first clamp 26 when the load on the load actuator 30 has decreased lower than the spring differential between the first spring constant $K_1$ and the second spring constant $K_2$. Accordingly, in FIG. 6-F, the second clamp 32 makes contact with the first clamp 26 (via sliding alignment with the notches) while the second clamp 32 starts to rotate into a position about the rotational axis R. In FIG. 6-G, the first clamp 26 and the second clamp 32 have re-engaged. And in FIG. 6-H, since the first clamp 26 and the second clamp 32 are fully re-engaged, the movable support 22 and the load actuator 30 translate together again as one unit within the body 12 of the multi-spring mechanical actuator 10, particularly according to the first spring 16 and the first spring constant $K_1$.

Figure 7:
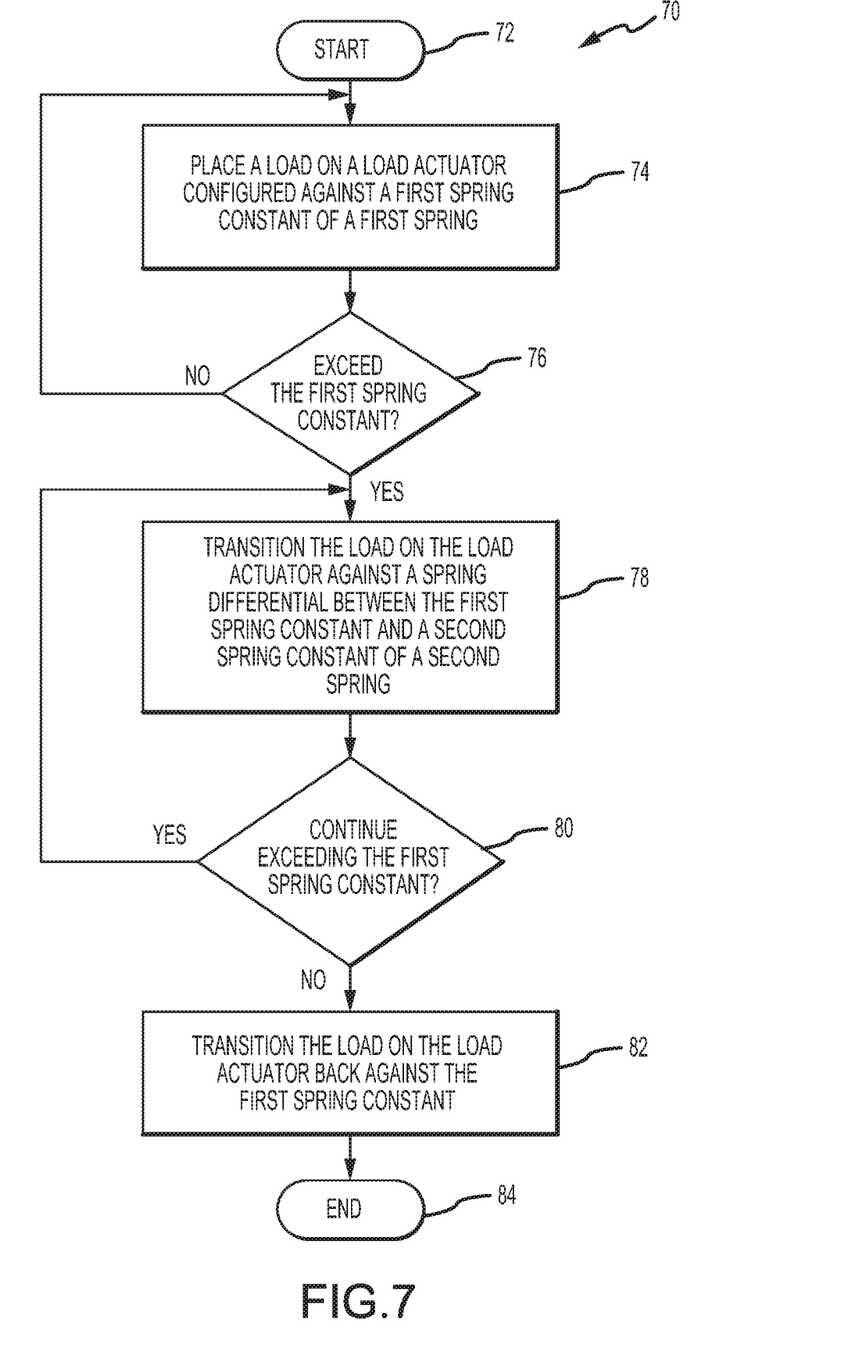
FIG. 7. is a flowchart of a method of configuring a load placed on a load actuator against a first spring constant of a first spring and transitioning the load placed on the load actuator against a spring differential between the first spring constant and a second spring constant of a second spring, according to various embodiments.

Referring now to FIG. 7, a method 70 begins in step 72, at which a load is placed on a load actuator configured against a first spring constant of a first spring in a step 74. Thereafter, if the first spring constant is not exceeded in a step 76, then the load on the load actuator remains configured against the first spring constant of the first spring according to the step 74. In various embodiments, if the first spring constant is exceeded in the step 76, then the load on the load actuator transitions to be against a spring differential between the first spring constant and a second spring constant of a second spring in a step 78. Thereafter, if the load on the load actuator continues to exceed the first spring constant at a step 80, then the load on the load actuator continues to be against the spring differential between the first spring constant and the second spring constant of the second spring at the step 78. In various embodiments, if the load on the load actuator does not continue to exceed the first spring constant at the step 80, then the load on the load actuator transitions back against the first spring constant of the first spring in a step 82. Thereafter, the method ends in a step 84, in various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A multi-spring mechanical actuator, comprising:
    a body having a cavity within the body;
    a first spring disposed within the cavity, the first spring having a first spring constant and attached between a fixed support at a first end of the body and a movable support, the movable support having a first clamp proximate a second end of the body opposite the first end of the body; and
    a second spring disposed within the cavity, the second spring having a second spring constant different than the first spring constant and attached between a load actuator at the second end of the body and the movable support, the load actuator having a second clamp proximate the first end of the body and configured for releasable engagement with the first clamp
    wherein the load actuator is configured against the first spring when the first clamp and the second clamp are engaged; and
    wherein the load actuator is configured against a spring differential between the first spring and the second spring when the first clamp and the second clamp are disengaged.

2. The multi-spring mechanical actuator of claim 1, wherein the movable support is translatable and rotable within the body.

3. The multi-spring mechanical actuator of claim 1, wherein the movable support includes one or more outwardly protruding tabs configured for translation and rotation within a track system of the body.

4. The multi-spring mechanical actuator of claim 3, wherein the track system is disposed within an internal wall of the body.

5. The multi-spring mechanical actuator of claim 1, wherein the load actuator is translatable and rotable within the body.

6. The multi-spring mechanical actuator of claim 1, wherein the load actuator includes one or more outwardly protruding tabs configured for translation and rotation within a track system of the body.

7. The multi-spring mechanical actuator of claim 6, wherein the track system is disposed within an internal wall of the body.

8. The multi-spring mechanical actuator of claim 1, wherein the first spring constant is greater than the second spring constant.

9. The multi-spring mechanical actuator of claim 1, wherein the first clamp contains one or more support elements configured for engagement and disengagement with one or more support elements from the second clamp.

10. The multi-spring mechanical actuator of claim 9, wherein the support elements of the first clamp and the support elements of the second clamp are configured to rotably engage to translate the movable support and the load actuator together against the first spring.

11. The multi-spring mechanical actuator of claim 9, wherein the support elements of the first clamp and the support elements of the second clamp are configured to rotably disengage to translate the load actuator against the spring differential.

12. The multi-spring mechanical actuator of claim 1, wherein the body includes a track system for translating and rotating the movable support and the load actuator within the body.

13. A system for configuring a load placed on a load actuator, comprising:
    a first spring having a first spring constant; and
    a second spring having a second spring constant;
    wherein a load placed on the load actuator is configured against the first spring under a first loading condition up to a load threshold and against a spring differential between the first spring and the second spring when the load threshold is exceeded; and
    wherein an engagement/disengagement mechanism within the load actuator is configured to transition the load on the load actuator between the first spring and the spring differential.

14. The system of claim 13, wherein the engagement/disengagement mechanism is configured to transition the load on the load actuator from the first spring to the spring differential.

15. The system of claim 13, wherein the engagement/disengagement mechanism is configured to transition the load on the load actuator from the spring differential to the first spring.

16. The system of claim 13, wherein the first spring constant is greater than the second spring constant.

17. A method for configuring a load placed on a load actuator, comprising:
    placing a load on a load actuator configured against a first spring constant of a first spring;
    disengaging a first clamp and a second clamp;
    transitioning the load on the load actuator against a spring differential between the first spring constant and a second spring constant of a second spring when the first clamp and the second clamp are disengaged;
    engaging the first clamp and the second clamp;
    transitioning the load on the load actuator against the first spring constant when the first clamp and the second clamp are engaged.

18. The method of claim 17, wherein the first spring constant is greater than the second spring constant.

19. The method of claim 17, wherein the first spring constant is greater than the second spring constant.

* * * * *

UNITED STATES PATENT AND TRADEMARK OFFICE
CERTIFICATE OF CORRECTION

PATENT NO. : 10,527,025 B2  
APPLICATION NO. : 15/863420  
DATED : January 7, 2020  
INVENTOR(S) : Ravi Chand Jindal Page 1 of 1

It is certified that error appears in the above-identified patent and that said Letters Patent is hereby corrected as shown below:

On the Title Page

Item (73) in Assignee:
Please delete "UNTIED" and insert --UNITED--

Signed and Sealed this  
Seventh Day of July, 2020

Andrei Iancu  
*Director of the United States Patent and Trademark Office*